(12) United States Patent
Vandrovec et al.

(10) Patent No.: US 12,386,650 B2
(45) Date of Patent: Aug. 12, 2025

(54) READ-ONLY MODE FOR VIRTUAL TRUSTED PLATFORM MODULE (TPM) DEVICES

(71) Applicant: VMware LLC, Pala Alto, CA (US)

(72) Inventors: Petr Vandrovec, Cupertino, CA (US); Ivan Dimitrov Velevski, Vratsa (BG)

(73) Assignee: VMware LLC, Palo Alto, CA (US)

( * ) Notice: Subject to any disclaimer, the term of this patent is extended or adjusted under 35 U.S.C. 154(b) by 300 days.

(21) Appl. No.: 18/146,221

(22) Filed: Dec. 23, 2022

(65) Prior Publication Data

US 2024/0211294 A1 Jun. 27, 2024

(51) Int. Cl.
*G06F 9/455* (2018.01)
*H04L 9/08* (2006.01)
*H04L 9/32* (2006.01)

(52) U.S. Cl.
CPC ........ *G06F 9/45558* (2013.01); *H04L 9/0877* (2013.01); *H04L 9/3263* (2013.01); *G06F 2009/45587* (2013.01)

(58) Field of Classification Search
CPC ............. G06F 9/45533; G06F 9/45558; G06F 2009/45562; G06F 2009/45587; H04L 9/0877; H04L 9/3263
See application file for complete search history.

(56) References Cited

U.S. PATENT DOCUMENTS

| | | | | |
|---|---|---|---|---|
| 9,202,046 B2 * | 12/2015 | Dumitru | ............. | G06F 9/45558 |
| 9,784,260 B2 * | 10/2017 | Lee | ...................... | G06F 9/45558 |
| 10,509,914 B1 * | 12/2019 | Desai | .................... | G06F 21/604 |
| 11,269,992 B2 * | 3/2022 | Kiperberg | ........... | G06F 12/1045 |
| 2009/0125974 A1 | 5/2009 | Zhang et al. | | |
| 2012/0297177 A1 * | 11/2012 | Ghosh | ................... | G06F 21/575 |
| | | | | 713/2 |
| 2014/0068612 A1 * | 3/2014 | Torrey | ................ | G06F 9/45558 |
| | | | | 718/1 |
| 2020/0099536 A1 * | 3/2020 | Block | ................... | H04L 9/3236 |
| 2023/0095454 A1 * | 3/2023 | Elliott | .................. | G06F 1/3203 |
| | | | | 718/1 |

FOREIGN PATENT DOCUMENTS

CN 108170516 A 6/2018

OTHER PUBLICATIONS

European Patent Office, Extended Search Report, Application No. 23216266.9, May 28, 2024, 5 pages.

* cited by examiner

Primary Examiner — Hosuk Song
(74) Attorney, Agent, or Firm — Quarles & Brady LLP

(57) ABSTRACT

Techniques for implementing a read-only mode for a virtual TPM device are provided. In one set of embodiments, while operating in this read-only mode, the virtual TPM device will not generate, store, or allow the use of any security sensitive data, thereby avoiding the security risks arising out of replicating (e.g., cloning) a VM or VM template that includes the device.

21 Claims, 8 Drawing Sheets

READ-ONLY MODE FOR VIRTUAL TRUSTED PLATFORM MODULE (TPM) DEVICES

BACKGROUND

Unless otherwise indicated, the subject matter described in this section is not prior art to the claims of the present application and is not admitted as being prior art by inclusion in this section.

A trusted platform module (TPM) device is a secure cryptoprocessor, typically implemented as a microchip and installed on the motherboard of a computer, that facilitates the secure generation, storage, and use of cryptographic keys by the computer's operating system (OS) and applications, as well as the creation of a trusted log of the computer's boot process for use in platform attestation. A virtual TPM device is a software representation of a TPM device that is exposed by a hypervisor to a virtual machine (VM) and that enables the VM to access TPM functions emulated by the hypervisor.

Some modern OSs such as Windows 11 require the presence of a TPM device on a computing platform in order for the OS to be successfully installed on that platform. This requirement is problematic in a virtualized deployment because several VM provisioning workflows that are commonly employed in such a deployment involve replicating the configuration of a single (i.e., source) VM or VM template into multiple new VMs. If the source VM or VM template includes a virtual TPM device (which is required for installation of a guest OS like Windows 11), the entire contents of that virtual TPM device, including any security sensitive data held by the device such as cryptographic keys and TPM identity information, will be duplicated in each new VM created from the source VM/VM template. This situation is undesirable because it contradicts the design principles of the TPM specification (which states that each TPM device must have a unique identity and not allow exporting of security sensitive data) and increases the attack surface for malicious parties attempting to break the security of the virtual TPM device.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Certain embodiments of the present disclosure are directed to techniques for implementing a read-only mode for a virtual TPM device (also referred to herein as a virtual secure cryptoprocessor). In one set of embodiments, while operating in this read-only mode, the virtual TPM device will not generate, store, or allow the use of any security sensitive data, thereby avoiding the security risks arising out of replicating (e.g., cloning) a VM or VM template that includes the device.

1. Example Virtualized Deployment and Solution Overview

Figure 1:
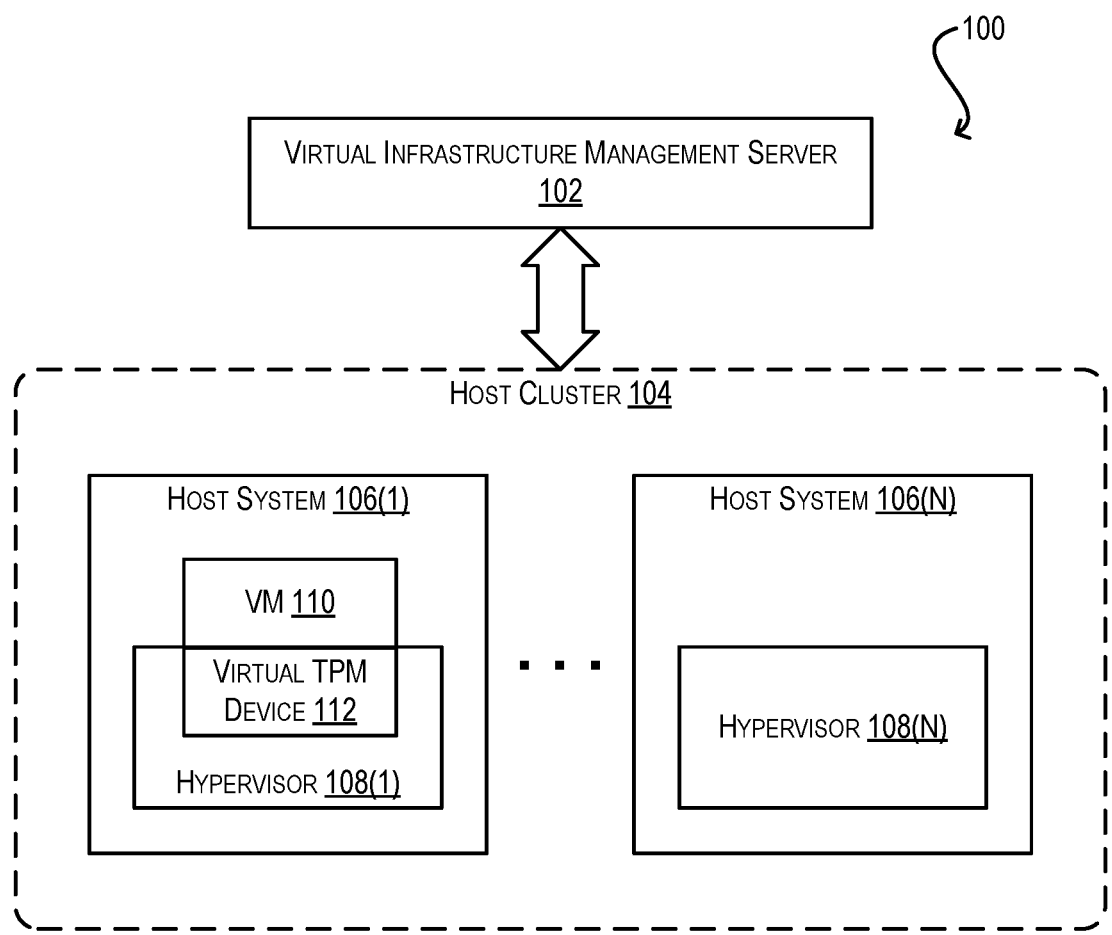
FIG. 1 depicts an example virtualized deployment comprising a VM with a virtual TPM device.

FIG. 1 is a simplified block diagram of an example virtualized deployment 100 in which embodiments of the present disclosure may be implemented. As shown, virtualized deployment 100 includes a virtual infrastructure management server 102 that is communicatively coupled with a host cluster 104 comprising a plurality of host systems 106(1)-(N). Virtual infrastructure management server 102 is a computer system or group of computer systems that is designated to manage the lifecycle and operation of host cluster 104 and its constituent components. For example, virtual infrastructure management server 102 may run an instance of VMware's vCenter Server or any other similar virtual infrastructure management software known in the art.

Each host system 106 of host cluster 104 is a computer system that executes virtualization software (i.e., a hypervisor 108) for running one or more VMs. In one set of embodiments, hypervisor 108 may be a bare-metal hypervisor such as VMware's ESXi. In the example of FIG. 1, host system 106(1) runs a VM 110 that makes use of a virtual TPM device 112 exposed and implemented by hypervisor 108(1). Virtual TPM device 112 is a software representation of a physical secure cryptoprocessor (i.e., a TPM device) and provides at least two security-related functions to its corresponding VM 110. First, it securely generates and stores cryptographic keys that may be used by the VM's guest OS and applications for various purposes, such as data encryption and digital signature creation. Second, it generates and stores a trusted log of the boot process of VM 110, including measurements/hashes of each piece of software executed during that process, which can be provided to a remote party or some other entity to attest the validity of the VM's boot state. This trusted boot log can also be employed to "seal" a cryptographic key held by virtual TPM device 112, such that the VM's guest OS or applications cannot retrieve and use the key unless the current boot configuration of the VM matches the contents of the trusted boot log as it existed at the time of key generation.

To enable the foregoing functions, at the time virtual TPM device 112 is first added to (or in other words, is made available for use by) VM 110, hypervisor 108(1) will typically generate and store identity information for the virtual TPM device comprising one or more random secret values, known as seeds, and a cryptographic certificate. This may occur when the VM is provisioned/created (if the VM is requested to be created with a virtual TPM device) or after VM creation (e.g., via a VM reconfiguration operation that adds the virtual TPM device to the VM). In one set of embodiments, the one or more seeds can include an endorsement seed, a storage seed, and a platform seed, and the cryptographic certificate can be configured to prove the authenticity of these seeds. This identity information is persisted between VM reboots in, e.g., an ".nvram" file of the VM and is used by virtual TPM device 112 to uniquely identify itself (for, e.g., platform attestation) and to deterministically generate cryptographic keys. Further, as VM 110 is running, virtual TPM device 112 will typically receive commands issued by the VM's guest software that pertain to the functionality of the device (e.g., generating/storing/using keys, carrying out platform attestation, etc.), execute the received commands, and return appropriate responses to the issuers.

As noted in the Background section, some modern OSs require a TPM device (and more precisely, a TPM 2.0 device) to be present on a computing platform before the OS can be successfully installed there; if no TPM device is present, the OS installation will fail. In the context of virtualized deployments such as deployment 100 of FIG. 1, this means that such an OS (hereinafter referred to as a TPM-compulsory OS) cannot be installed on a VM that does not have a virtual TPM device, which is problematic for several typical VM provisioning workflows.

For example, one typical VM provisioning workflow involves creating a VM template from a "golden" VM that includes a curated installation of a guest OS and applications for a particular business use case (e.g., a remote desktop for enterprise users) and using that VM template to deploy multiple new VMs. Another typical VM provisioning workflow involves creating multiple clones of a running or powered-off VM. The commonality between these various provisioning workflows is that the new VMs created via the workflows are identical in configuration to the original (i.e., source) VM or VM template. As a result, if the source VM or VM template is designed to include an installation of a TPM-compulsory guest OS (which is becoming increasingly common), the source VM/VM template must include a virtual TPM device. This in turn means that the virtual TPM device will be copied in its entirety, including its identity information and all generated cryptographic keys, to each new VM provisioned from the source VM/VM template, because the source VM/VM template's guest OS may have created and stored cryptographic keys in the virtual TPM device that are needed for proper operation. This replication of the virtual TPM device contents is undesirable for the reasons mentioned previously (e.g., it is contradictory to the principles of the TPM specification and introduces significant security risks). For example, if multiple VMs are created with identical virtual TPM device contents, an attacker could carry out a distributed brute force attack on those VMs to try and gain access to the device. This type of distributed attack would allow the attacker to effectively bypass certain attack prevention mechanisms built into the virtual TPM device, such as locking it for a period of time after a number of unsuccessful authentication attempts, because the attacker could simply continue their attack on another VM once they have been locked out from a previous one.

One way to work around this problem with respect to template-based VM provisioning is to add a virtual TPM device to the golden VM, install the TPM-compulsory guest OS on that VM with the virtual TPM device present, prepare the guest OS for TPM removal (which includes disabling all guest software features that rely on the virtual TPM device), remove the virtual TPM device, and finally export a VM template from the VM. Upon creating a new VM from the resulting VM template, a new virtual TPM device can be added to that new VM and all guest software features that rely on the virtual TPM device can be re-enabled. However, this approach is cumbersome, error-prone, scales poorly, and requires intimate knowledge of the inner workings of the guest OS and all installed applications. In addition, it can be difficult for users to verify that all critical data has been removed from the golden VM's virtual TPM device after the removal preparation step.

Figure 2:
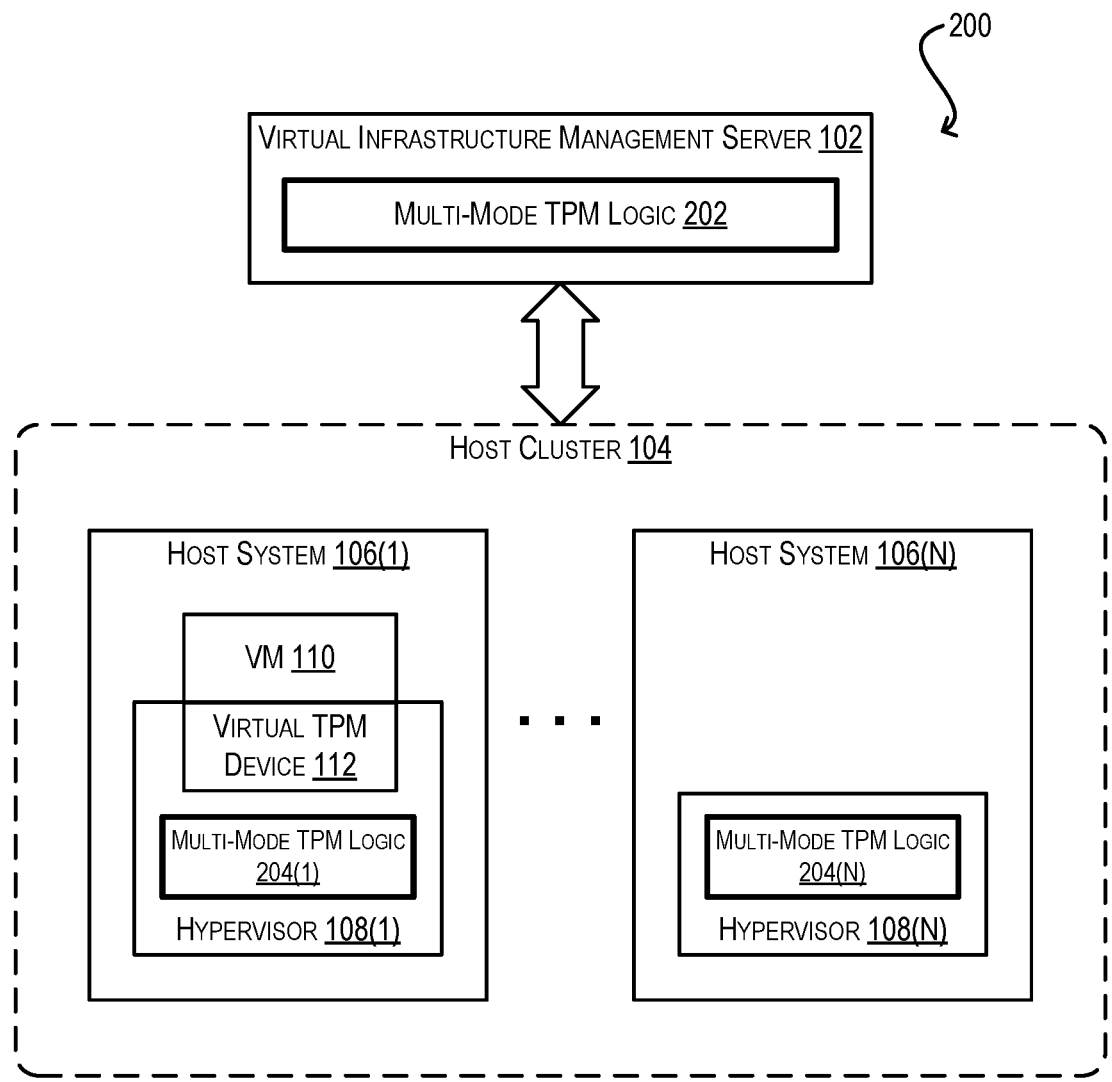
FIG. 2 depicts a modified version of the virtualized deployment of FIG. 1 that supports read-write and read-only virtual TPM operating modes according to certain embodiments.

To address the foregoing and other related issues, FIG. 2 depicts a modified version of virtualized deployment 100 of FIG. 1 (shown via reference numeral 200) that includes new "multi-mode TPM logic" components 202 and 204 in virtual infrastructure management server 102 and each hypervisor 108 respectively for supporting at least two distinct virtual TPM device operating modes: a read-write mode and a read-only mode. In particular, multi-mode TPM logic component 202 of virtual infrastructure management server 102 provides new application programming interfaces (APIs) that, among other things, allow for the provisioning of new VMs, either as standalone VMs or from an existing source VM or VM template, with a virtual TPM device in read-write mode (referred to as a read-write virtual TPM device) or in read-only mode (referred to as a read-only virtual TPM device). Further, multi-mode TPM logic component 204 of each hypervisor 108 comprises program code that enables the hypervisor to carry out the actual provisioning process of a VM with a read-write or a read-only virtual TPM device and to enforce the properties of these modes during the VM's runtime.

Generally speaking, the operation of a virtual TPM device in read-write mode is identical to a conventional virtual TPM device, and thus a read-write virtual TPM device is capable of performing all of the same tasks and functions as such a conventional device. In contrast, the operation of a virtual TPM device in read-only mode differs from a conventional virtual TPM device in at least two ways according to certain embodiments. First, a read-only virtual TPM device will not generate or store any identity information, such as seed values and a certificate, that can uniquely identify the device or be used to create cryptographic keys. Second, while a VM that includes a read-only virtual TPM device is running, the read-only virtual TPM device will not execute any commands pertaining to the generation, storage, or use of cryptographic keys. In some embodiments, the read-only virtual TPM device can continue to execute commands unrelated to the manipulation or management of cryptographic keys, such as commands needed for supporting the device's platform attestation functionality.

With these two virtual TPM device operating modes, embodiments of the present disclosure advantageously enable the efficient creation of a source VM or VM template that is both compatible with a TPM-compulsory guest OS and safe for duplication via common VM provisioning workflows. For example, a user can create a source VM with a read-only virtual TPM device and install a TPM-compulsory guest OS like Windows 11 on that source VM. This OS installation will complete successfully because a virtual TPM device is present. The user can then directly clone the source VM to provision multiple new VMs and/or export the source VM as a VM template and deploy new VMs from the template. Because the source VM/VM template includes a read-only virtual TPM device that does not hold TPM identity information or cryptographic keys by virtue of the read-only mode restrictions mentioned above, no security sensitive data will be replicated to the virtual TPM devices of the new VMs via this process. Accordingly, the VM provisioning process is greatly simplified while the security risks arising out of duplicating security sensitive TPM data is eliminated.

Once the new VMs are created, their virtual TPM devices can be transitioned from read-only mode to read-write mode (or alternatively, the new VMs can be provisioned with an indication that their virtual TPM devices should be initialized to read-write mode), which will cause (1) new identity information to be generated and stored for the virtual TPM devices and (2) all TPM command restrictions on the devices to be lifted. In this way, the new VMs can subsequently make use of the full feature set of these devices.

The remaining sections of this disclosure present various example workflows that may be executed by virtual infrastructure management server 102 and each hypervisor 108 of FIG. 2, in accordance with their respective multi-mode TPM logic components 202 and 204, for implementing the read-write and read-only virtual TPM device operating modes described herein. It should be appreciated that FIGS. 1 and 2 are illustrative and not intended to limit embodiments of the present disclosure. For example, although these figures depict a particular arrangement of components in virtualized deployments 100 and 200, other arrangements are possible (e.g., the functionality attributed to a particular component may be split into multiple components, components may be combined, etc.). One of ordinary skill in the art will recognize other variations, modifications, and alternatives.

2. Provisioning a New VM with a Read-Write or Read-Only Virtual TPM Device

Figure 3:
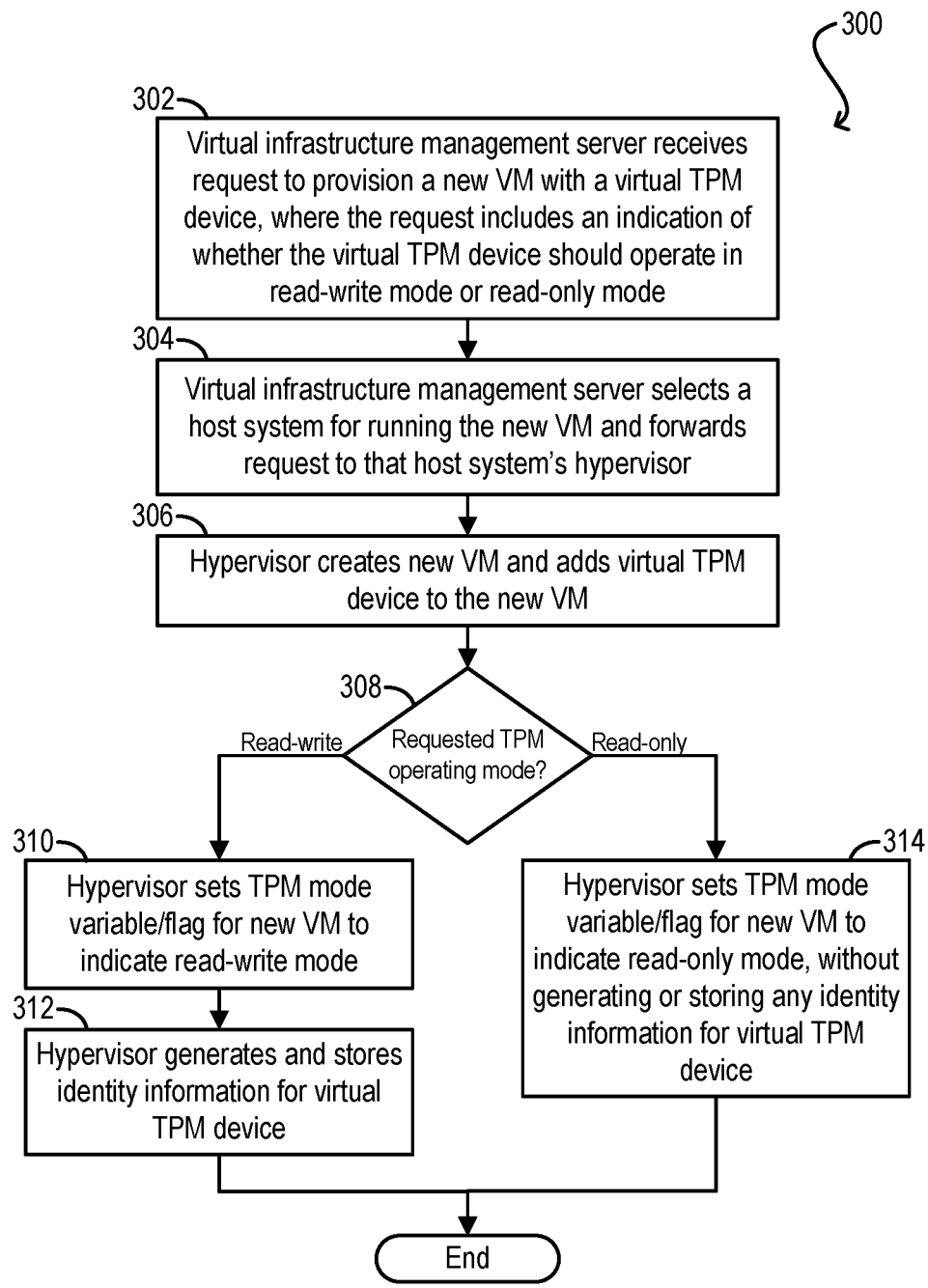
FIG. 3 depicts a workflow for provisioning from scratch a new VM that includes a read-write or read-only virtual TPM device according to certain embodiments.

FIG. 3 depicts a workflow 300 that may be performed by virtual infrastructure management server 102 and a hypervisor 108 of FIG. 2 via their multi-mode TPM logic components 202 and 204 for provisioning (from scratch) a new VM that includes either a read-write or read-only virtual TPM device according to certain embodiments.

At step 302, virtual infrastructure management server 102 can receive from, e.g., a user or an automated agent, a request to provision a new VM with a virtual TPM device, where the request includes an indication of whether the virtual TPM device should operate in read-write mode or read-only mode. For example, the user/automated agent may submit a request to provision a new VM with a read-only virtual TPM device if that VM is intended to be loaded with a TPM-compulsory guest OS and subsequently cloned or exported as a template.

At step 304, virtual infrastructure management server 102 can select a host system 106 for running the new VM and can forward the request to hypervisor 108 of the selected host system. In response, hypervisor 108 can create the new VM, add a virtual TPM device to the new VM in accordance with the request (step 306), and check whether the desired operating mode for the virtual TPM device as indicated in the request is read-write or read-only (step 308).

If the desired operating mode is read-write, hypervisor 108 can set (in, e.g., a metadata file associated with the new VM) a "TPM mode" variable or flag indicating that the virtual TPM device is in read-write mode (step 310) and can generate and store TPM identity information for the device in that metadata file (or in a different storage location) (step 312). As mentioned previously, this identity information can include one or more random secret seeds (e.g., an endorsement seed, storage seed, and platform seed) and a cryptographic certificate usable for verifying the authenticity of the seeds.

Conversely, if the desired operating mode is read-only, hypervisor 108 can set the TPM mode variable/flag to indicate that the virtual TPM device is in read-only mode, without generating or storing any TPM identity information for the device (step 314) and the workflow can end.

Figure 4:
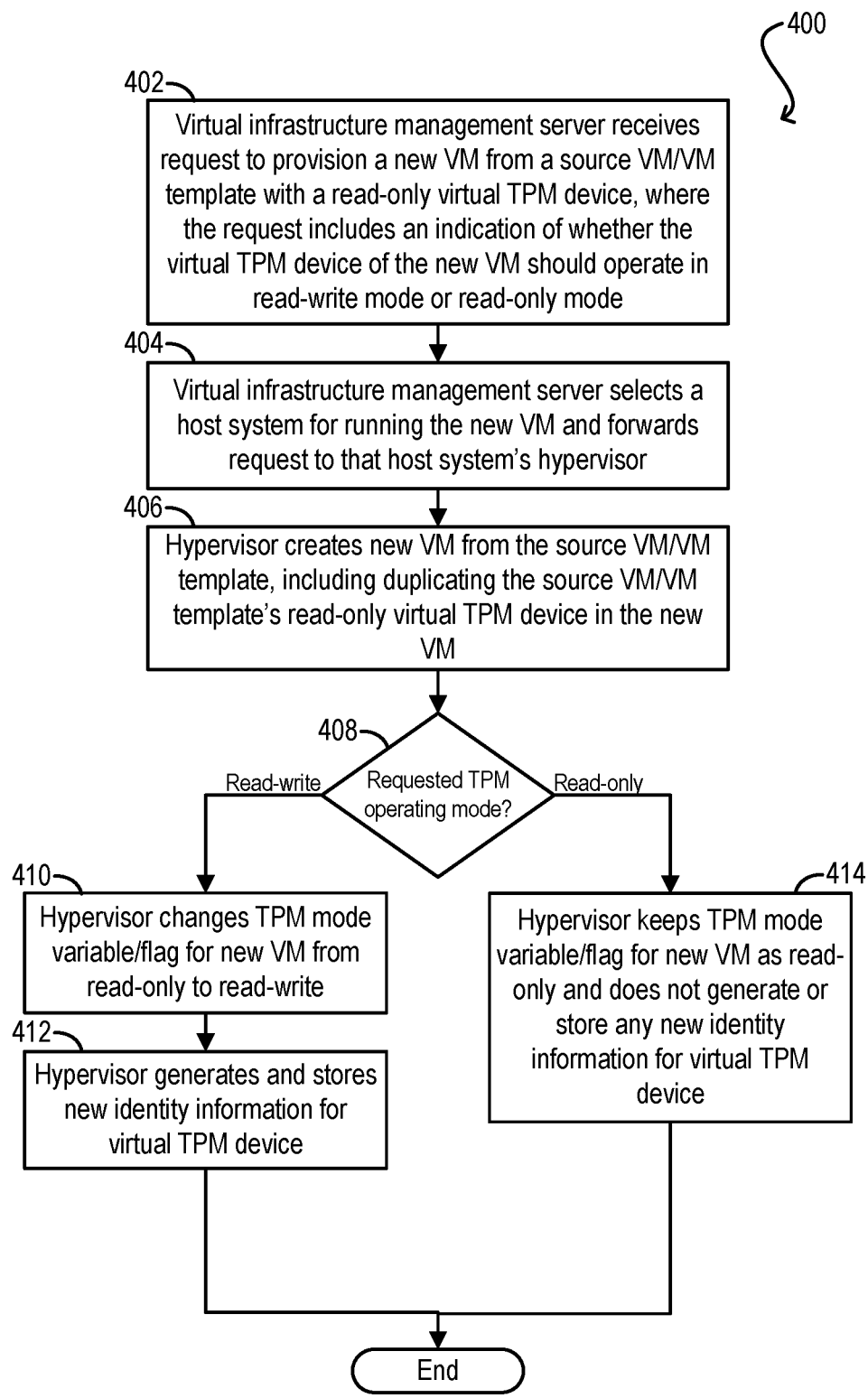
FIG. 4 depicts a workflow for provisioning a new VM from a source VM or VM template that includes a read-write or read-only virtual TPM device according to certain embodiments.

3. Provisioning a New VM from a Source VM/VM Template with a Read-Only Virtual TPM Device FIG. 4 depicts a workflow 400 that may be performed by virtual infrastructure management server 102 and a hypervisor 108 of FIG. 2 via their multi-mode TPM logic components 202 and 204 for provisioning a new VM from a source VM or VM template that includes a read-only virtual TPM device according to certain embodiments. For example, the source VM may have been created with a read-only virtual TPM device using workflow 300 of FIG. 3.

At step 402, virtual infrastructure management server 102 can receive from, e.g., a user or an automated agent, a request to provision a new VM from a source VM or VM template having a read-only virtual TPM device, where the request includes an indication of whether the virtual TPM device of the new VM should be read-write or read-only.

At step 404, virtual infrastructure management server 102 can select a host system 106 for running the new VM and can forward the request to hypervisor 108 of the selected host system. In response, hypervisor 108 can create the new VM from the source VM/VM template in accordance with the request (which includes adding a virtual TPM device to the new VM and duplicating the read-only configuration of the source VM/VM template's virtual TPM device in the new VM's virtual TPM device) (step 406) and check whether the desired operating mode for the new VM's virtual TPM device as indicated in the request is read-write or read-only (step 408).

If the desired operating mode is read-write, hypervisor 108 can change the TPM mode variable or flag for the new VM's virtual TPM device from read-only to read-write (step 410) and can generate and store new TPM identity information for the device (step 412).

However, if the desired operating mode is read-only, hypervisor 108 can keep the VM's TPM mode variable/flag as read-only without generating or storing any new identity information for the device (step 414) and the workflow can end.

Although not shown in workflow 400, in some embodiments the VM provisioning request received at step 402 may not include an indication of whether the virtual TPM device of the new VM should operate in read-only mode or read-write mode. In these embodiments, virtual infrastructure management server 102/hypervisor 108 may default to creating the new VM with a read-write virtual TPM device. This is consistent with the most likely use case for workflow 400 (i.e., the provisioning of multiple new VMs with read-write virtual TPM devices from a source VM/VM template with a read-only virtual TPM device).

Further, as mentioned previously, in the scenario where the new VM is provisioned with a read-only virtual TPM device, that virtual TPM device can be transitioned from read-only mode to read-write mode at a later time, either while the new VM is running or powered off. In various embodiments, performing this transition will result in the generation and storage of a new set of identity information for the virtual TPM device and remove the read-only mode restrictions on the device's ability to execute key management commands, thereby switching the device to its full operational capabilities.

4. VM Reconfiguration Workflows

Figure 5:
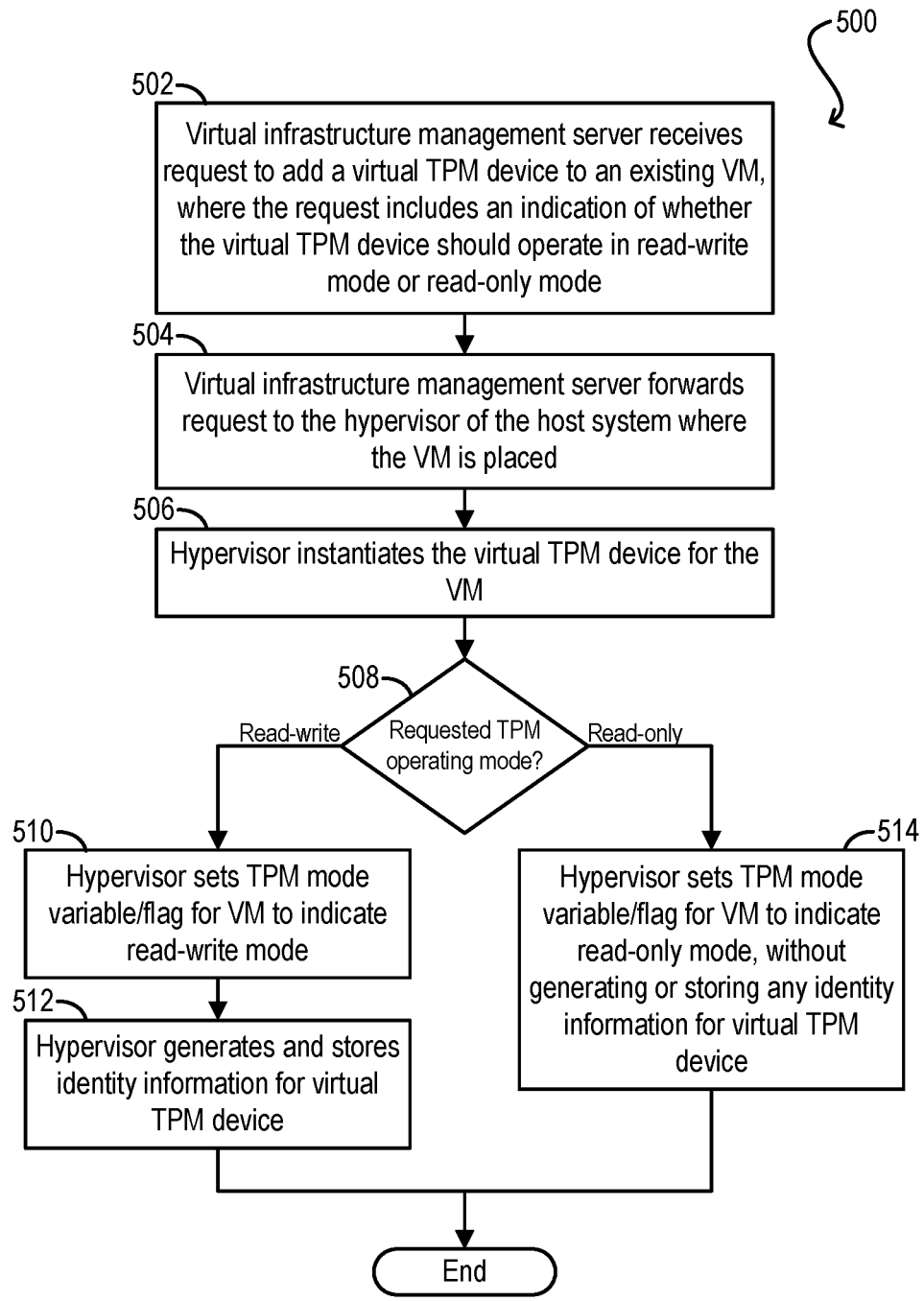
FIGS. 5 and 6 depict workflows for performing TPM-related reconfiguration of a VM according to certain embodiments.
Figure 6:
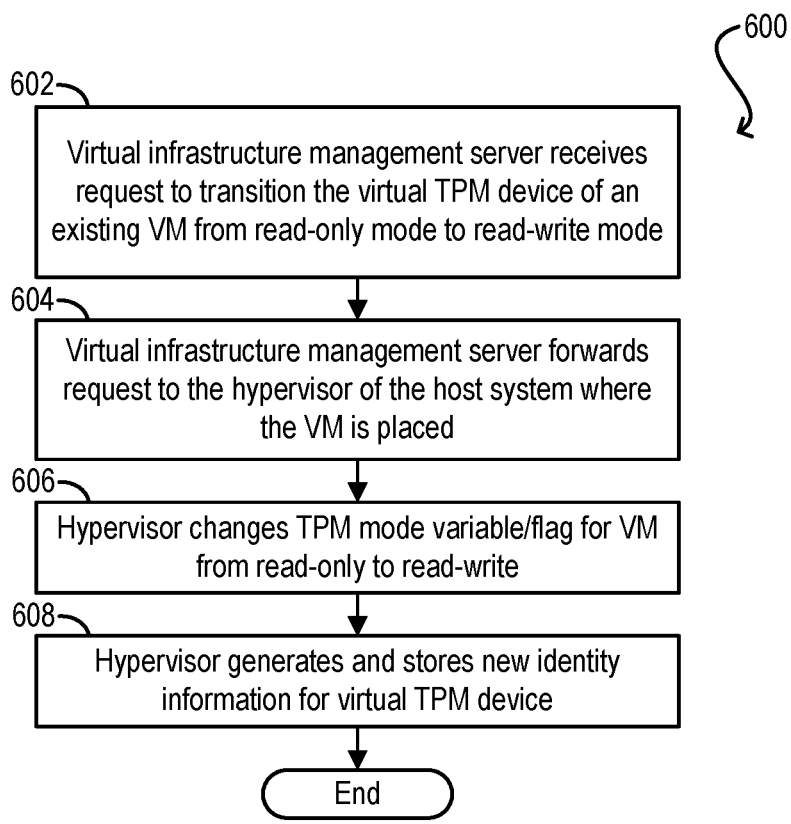

FIGS. 5 and 6 depict workflows that may be performed by virtual infrastructure management server 102 and a hypervisor 108 of FIG. 2 via their multi-mode TPM logic components 202 and 204 for performing TPM-related reconfiguration of a VM according to certain embodiments. In particular, FIG. 5 depicts a workflow 500 for adding a read-write or read-only virtual TPM device to an existing VM that does not have such a device and FIG. 6 depicts a workflow 600 for transitioning a read-only virtual TPM device of an existing VM from read-only mode to read-write mode.

Starting with workflow 500, virtual infrastructure management server 102 can receive from, e.g., a user or an automated agent, a request to add a virtual TPM device to an existing VM, where the request includes an indication of whether the virtual TPM device should operate in read-write mode or read-only mode (step 502). In response, virtual infrastructure management server 102 can forward the request to hypervisor 108 of the host system where the VM is placed (step 504).

At steps 506 and 508, hypervisor 108 can instantiate the virtual TPM device for the VM and check the requested TPM operating mode. If the requested mode is read-write, hypervisor 108 can set (in, e.g., a metadata file associated with the VM) the VM's TPM mode variable or flag to indicate read-write mode (step 510) and can generate and store new TPM identity information for the device in that metadata file (or in a different storage location) (step 512). Alternatively, if the requested mode is read-only, hypervisor 108 can set the TPM mode variable/flag to indicate read-only mode, without generating or storing any new identity information for the device (step 514).

Turning now to workflow 600, at step 602 virtual infrastructure management server 102 can receive from, e.g., a user or an automated agent, a request to transition a virtual TPM device of an existing VM from read-only mode or read-write mode. For example, this existing VM may be a running or powered-off VM that was provisioned from a source VM/VM template with a read-only virtual TPM device. In response, virtual infrastructure management server 102 can forward the request to hypervisor 108 of the host system where the VM is placed (step 604).

At steps 606 and 608, hypervisor 108 can change the VM's TPM mode variable or flag from read-only to read-write and can generate and store new TPM identity information for the device. As discussed in the next section, this will enable the virtual TPM device to operate according to its full capabilities (i.e., without any restrictions on the commands it may execute).

5. VM Runtime Workflows

Figure 7:
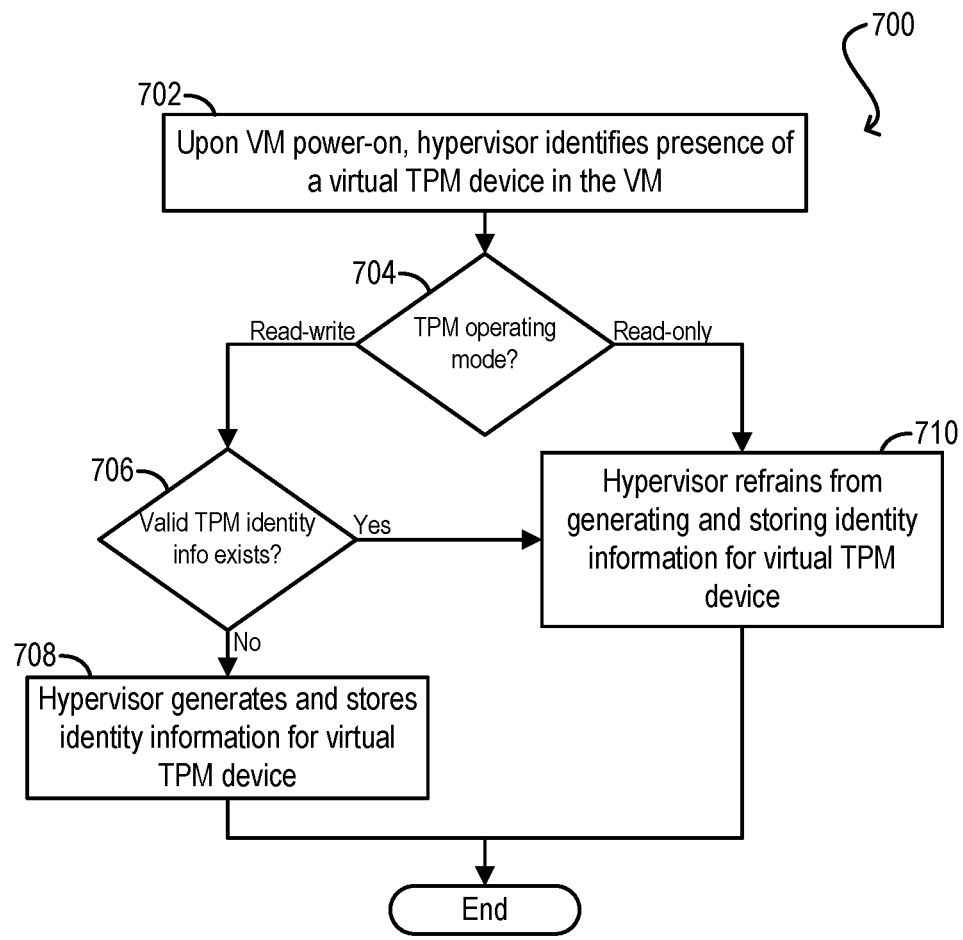
FIGS. 7 and 8 depict runtime workflows for managing a VM that has a read-write or read-only virtual TPM device according to certain embodiments.
Figure 8:
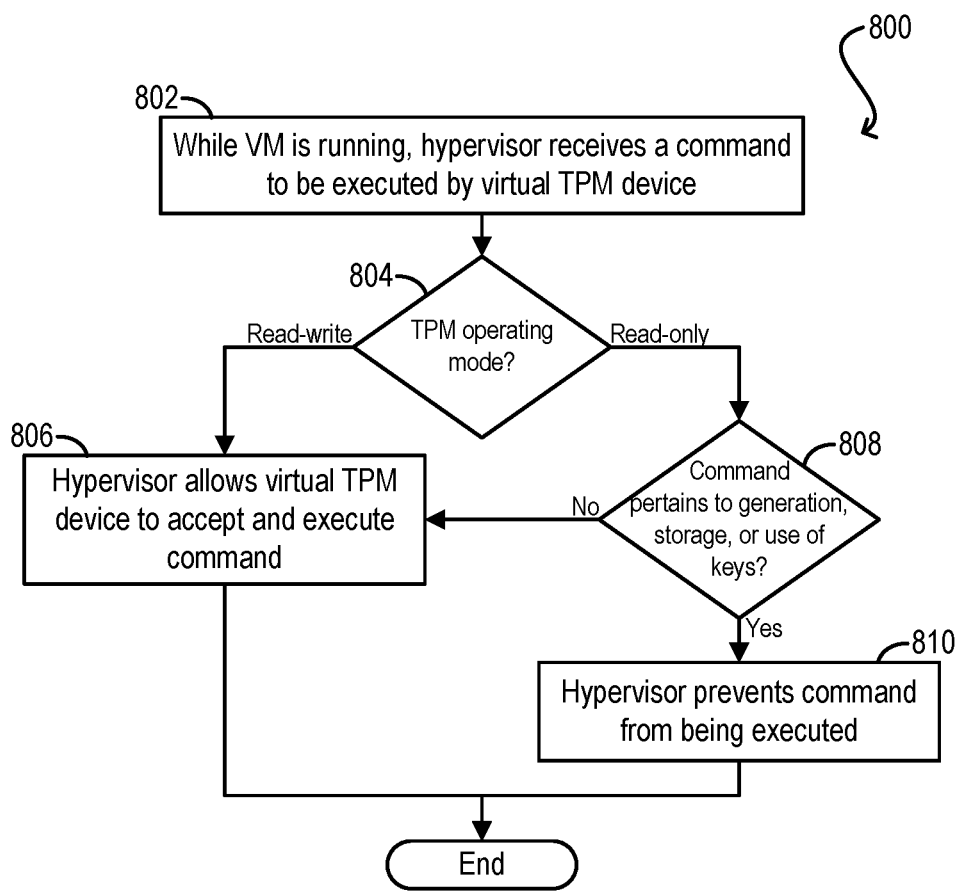

FIGS. 7 and 8 depicts workflows that may be performed by a hypervisor 108 of FIG. 2 via its multi-mode TPM logic component 204 at the time of running a VM with a read-write or read-only virtual TPM device according to certain embodiments. For example, the VM may have been created from scratch via workflow 300 of FIG. 3, created from a source VM/VM template with a read-write or read-only virtual TPM device via workflow 400 of FIG. 4, or may have had a read-write or read-only virtual TPM device added to it after VM creation via workflow 500 of FIG. 5. In particular, FIG. 7 depicts a workflow 700 that may be performed by hypervisor 108 upon power-on of the VM and FIG. 8 depicts a workflow 800 that may be performed by hypervisor 108 while the VM is running/operational.

Starting with workflow 700, upon power-on of the VM, hypervisor 108 can identify the presence of a virtual TPM device in the VM (step 702) and can determine whether the virtual TPM device is read-write mode or read-only mode (step 704). This determination can involve checking the value of the VM's TPM mode variable/flag.

If the virtual TPM device is in read-write mode, hypervisor 108 can further check whether valid identity information has been generated and stored for the device (step 706). If the answer is no, hypervisor 108 can cause the device to generate and store identity information in accordance with conventional virtual TPM device operation (step 708). As mentioned previously, this identity information can include one or more random secret seeds (e.g., an endorsement seed, storage seed, and platform seed) and a cryptographic certificate usable for verifying the authenticity of the seeds, and can be persisted in a metadata (e.g., .nvram) file associated with the VM.

However, if the answer at step 706 is no (or if the virtual TPM device is in read-only mode), hypervisor 108 can refrain from generating or storing any identity information for the device (as well as any other security sensitive information that may be generated upon first power-on by a conventional virtual TPM device) (step 710).

Turning now to workflow 800, while the VM is running/operational, hypervisor 108 can receive from the VM's guest software a command to be executed by the virtual TPM device (step 802). In response, hypervisor 108 can determine whether the virtual TPM device is in read-write mode or read-only mode (step 804).

If the virtual TPM device is in read-write mode, hypervisor 108 can allow the virtual TPM device to accept and execute the command (step 806).

However, if the virtual TPM device is in read-only mode, hypervisor 108 can further check whether the command pertains to the management of one or more cryptographic keys by the virtual TPM device (step 808). Examples of such commands include commands for generating cryptographic keys, commands for storing cryptographic keys, commands for using/applying cryptographic keys, and commands for sealing or unsealing cryptographic keys.

If the answer at step 808 is no (i.e., the command does not pertain to key management), hypervisor 108 can allow the virtual TPM device to accept and execute the command per previous step 806.

However, if the answer at step 808 is yes (i.e., the command does pertain to key management), hypervisor 108 can prevent the command from being executed by the virtual TPM device (step 810). In one set of embodiments, steps 808 and 810 can be implemented by maintaining a blacklist of restricted key management commands and checking whether the received command is in the blacklist. If so, hypervisor 108 can cause the virtual TPM device to return an error message indicating that the command cannot be executed because the virtual TPM device is in read-only mode.

In other embodiments, other techniques may be used for implementing steps 808 and 810. For example, one of ordinary skill in the art will recognize various alternative approaches.

At the conclusion of either step 806 or 810 workflow 800 can end. It should be noted that while the virtual TPM device is restricted from executing key management commands while operating in read-only mode, the virtual TPM device will still be able to execute other types of commands that pertain to other aspects of its functionality like platform attestation. This is significant because the virtual TPM device may need data or metadata regarding those other functionalities, such as the trusted boot log, to be present in order to successfully transition from read-only mode to read-write mode while the VM is running.

Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the present disclosure. In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
adding, by a hypervisor of a computer system, a virtual trusted platform module (TPM) device to a virtual machine (VM);
determining, by the hypervisor, whether the virtual TPM device should operate in a read-only mode or a read-write mode; and
upon determining that the virtual TPM device should operate in the read-only mode, refraining, by the hypervisor, from generating and storing identity information usable for uniquely identifying the virtual TPM device;
while the VM is running:
receiving, from guest software of the VM, a command directed to the virtual TPM device;
in response to the receiving, determining whether the virtual TPM device is operating in the read-only mode or the read-write mode; and
upon determining that the virtual TPM device is operating in the read-only mode, preventing the command from being executed if the command pertains to generation, storage, or use of one or more cryptographic keys by the virtual TPM device.

2. The method of claim 1 wherein the identity information includes one or more seed values and a cryptographic certificate.

3. The method of claim 1 further comprising:
upon determining that the virtual TPM device should operate in the read-write mode, generating and storing the identity information for the virtual TPM device.

4. The method of claim 1 further comprising:
upon determining that the virtual TPM device is operating in the read-write mode, allowing the command to be executed.

5. The method of claim 1 wherein the preventing comprises:
determining that the command is in a blacklist of commands pertaining to the generation, storage, or use of one or more cryptographic keys by the virtual TPM device; and
performing the preventing in response to determining that the command is in the blacklist.

6. The method of claim 1 wherein determining whether the virtual TPM device is operating in the read-write mode or the read-only mode comprises checking a value of a variable or flag persisted in a metadata file of the VM.

7. The method of claim 1 wherein the adding, determining, and refraining is performed at a time of creating the VM, cloning the VM from a source VM, or reconfiguring the VM.

8. A non-transitory computer readable storage medium having stored thereon program code executable by a hypervisor of a computer system, the program code embodying a method comprising:
- adding a virtual secure cryptoprocessor to a virtual machine (VM);
- determining whether the virtual secure cryptoprocessor should operate in a read-only mode or a read-write mode; and
- upon determining that the virtual secure cryptoprocessor should operate in the read-only mode, refraining from generating and storing identity information usable for uniquely identifying the virtual secure cryptoprocessor;
- while the VM is running:
  - receiving, from guest software of the VM, a command directed to the virtual TPM device;
  - in response to the receiving, determining whether the virtual TPM device is operating in the read-only mode or the read-write mode; and
  - upon determining that the virtual TPM device is operating in the read-only mode, preventing the command from being executed if the command pertains to generation, storage, or use of one or more cryptographic keys by the virtual TPM device.

9. The non-transitory computer readable storage medium of claim 8 wherein the identity information includes one or more seed values and a cryptographic certificate.

10. The non-transitory computer readable storage medium of claim 8 wherein the method further comprises:
- upon determining that the virtual secure cryptoprocessor should operate in the read-write mode, generating and storing the identity information for the virtual secure cryptoprocessor.

11. The non-transitory computer readable storage medium of claim 8 wherein the method further comprises:
- upon determining that the virtual secure cryptoprocessor is operating in the read-write mode, allowing the command to be executed.

12. The non-transitory computer readable storage medium of claim 8 wherein the preventing comprises:
- determining that the command is in a blacklist of commands pertaining to the generation, storage, or use of one or more cryptographic keys by the virtual secure cryptoprocessor; and
- performing the preventing in response to determining that the command is in the blacklist.

13. The non-transitory computer readable storage medium of claim 8 wherein determining whether the virtual secure cryptoprocessor is operating in the read-write mode or the read-only mode comprises checking a value of a variable or flag persisted in a metadata file of the VM.

14. The non-transitory computer readable storage medium of claim 8 wherein the adding, determining, and refraining is performed at a time of creating the VM, cloning the VM from a source VM, or reconfiguring the VM.

15. A computer system comprising:
- a processor; and
- a non-transitory storage medium having stored thereon program code for a hypervisor that, when executed by the processor, causes the hypervisor to:
  - add a virtual trusted platform module (TPM) device to a virtual machine (VM);
  - determine whether the virtual TPM device should operate in a read-only mode or a read-write mode; and
  - upon determining that the virtual TPM device should operate in the read-only mode, refrain from generating and storing identity information usable for uniquely identifying the virtual TPM device;
  - while the VM is running:
  - receiving, from guest software of the VM, a command directed to the virtual TPM device;
  - in response to the receiving, determining whether the virtual TPM device is operating in the read-only mode or the read-write mode; and
    - upon determining that the virtual TPM device is operating in the read-only mode, preventing the command from being executed if the command pertains to generation, storage, or use of one or more cryptographic keys by the virtual TPM device.

16. The computer system of claim 15 wherein the identity information includes one or more seed values and a cryptographic certificate.

17. The computer system of claim 15 wherein the program code further causes the hypervisor to:
- upon determining that the virtual TPM device should operate in the read-write mode, generate and store the identity information for the virtual TPM device.

18. The computer system of claim 15 wherein the program code further causes the hypervisor to:
- upon determining that the virtual TPM device is operating in the read-write mode, allow the command to be executed.

19. The computer system of claim 15 wherein the program code that causes the hypervisor to prevent the command from being executed comprises program code that causes the hypervisor to:
- determine that the command is in a blacklist of commands pertaining to the generation, storage, or use of one or more cryptographic keys by the virtual TPM device; and
- perform the preventing in response to determining that the command is in the blacklist.

20. The computer system of claim 15 wherein the program code that causes the hypervisor to determine whether the virtual TPM device is operating in the read-write mode or the read-only mode comprises program code that causes the hypervisor to check a value of a variable or flag persisted in a metadata file of the VM.

21. The computer system of claim 15 wherein the adding, determining, and refraining is performed at a time of creating the VM, cloning the VM from a source VM, or reconfiguring the VM.

* * * * *